Figure 1:
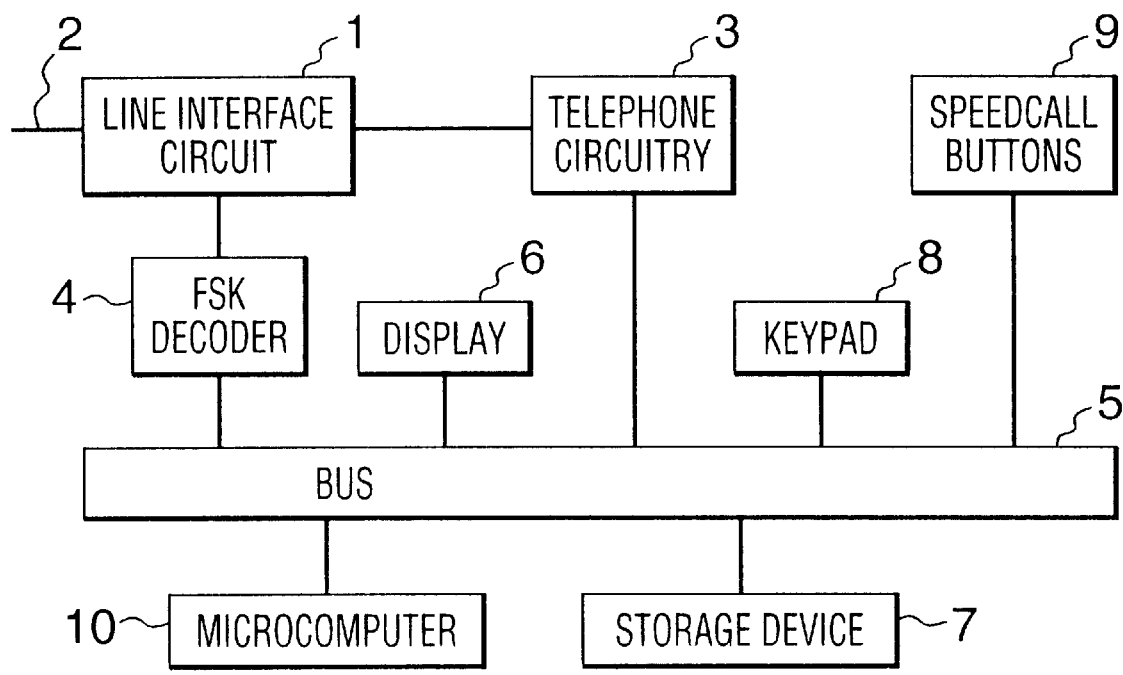

United States Patent [19]
Bijman

[11] Patent Number: 6,047,062
[45] Date of Patent: *Apr. 4, 2000

[54] AUTOMATIC SPEED CALL UPDATING

[75] Inventor: Ed Bijman, Stittsville, Canada

[73] Assignee: Mitel Corporation, Kanata, Canada

[ * ] Notice: This patent issued on a continued prosecution application filed under 37 CFR 1.53(d), and is subject to the twenty year patent term provisions of 35 U.S.C. 154(a)(2).

[21] Appl. No.: 08/885,033

[22] Filed: Jun. 30, 1997

[30]  Foreign Application Priority Data

Jul. 8, 1996  [CA]  Canada ................................... 2180690

[51] Int. Cl.[7] ................................................. H04M 1/00
[52] U.S. Cl. .......................... 379/355; 379/354; 379/142; 379/127
[58] Field of Search ................................. 379/142, 93.17, 379/69, 354, 355, 127, 215, 88.9, 88.2, 88.21

[56]  References Cited

U.S. PATENT DOCUMENTS 4,924,496  5/1990  Figa et al. ................................. 379/142
5,734,706  3/1998  Windsor et al. ......................... 379/142

OTHER PUBLICATIONS

Sony "Cordless Telephone With Answering System" Operating Instruction, SPP–A400 p. 16, 1977.

*Primary Examiner*—N. Le
*Assistant Examiner*—Shih-Wen Hsieh
*Attorney, Agent, or Firm*—Marks & Clerk

[57]  ABSTRACT

A method of updating speedcall numbers stored in a database comprises the steps of receiving an incoming call at a local telephone station, extracting data representing the calling party's name and telephone number from the incoming call, and comparing the extracted data with name and number data stored in a database in the local telephone station. The number data in the local telephone station is updated when the extracted data and the stored data does not match.

6 Claims, 1 Drawing Sheet

6,047,062

AUTOMATIC SPEED CALL UPDATING

This invention relates to an apparatus for automatically updating speedcall buttons on a speedcall capable telephone.

Many telephone sets have the capability of permitting the user to assign buttons, or alternatively use a short code, to specific subscribers that the user may wish to call. Pressing the assigned button causes the telephone to dial the associated number. A business person might assign buttons or shortened codes to frequently called customers. This system can be especially useful in the case of long distance or international numbers, where the number of digits to be dialed can be quite long.

A problem arises when the subscribers entered into the speedcall system change their telephone number. The user must then reprogram the telephone number for the moved subscriber. This can be a frustrating and error-prone operation, especially some years later when the user's manual for the telephone set has often long been lost.

An object of the invention is to alleviate the aforementioned problem.

Accordingly, a first aspect of the invention provides a method of updating speedcall numbers stored in a database comprising the steps of receiving an incoming call at a local telephone station, extracting data representing the calling party's name and telephone number from the incoming call, comparing said extracted data with name and number data stored in a database in said local telephone station and updating the number data in said local telephone station when the extracted data and stored data does not match.

The invention preferably works by extracting the data from the CLASS signals embedded between the ringing signals of the incoming call. These CLASS signals appear as an FSK (Frequency Shift Modulated) signal between the ringing signals.

The data base can be associated with speedcall buttons, or alternatively simplified codes, for example two digit codes. The user might press the code, for example, *05 to initiate the dialing of a ten digit long distance number.

A second aspect of the invention provides a telephone apparatus with speedcall capability, comprising a database for storing data representing names and associated telephone numbers, a decoder for extracting name and number data from an incoming call, means for comparing the incoming number data with said stored data, and means for updating the stored number data when it does not match the extracted n~☐mher data.

The present invention will now be described in more detail, by way of example only, with reference to the accompanying drawings, in which the single figure is a block diagram of the system in accordance with the invention.

In the Figure, line interface circuit 1 is connected to an external telephone line connected to the PSTN (Public Switch Telephone Network). The line interface circuit is connected to telephone circuitry 3, which enables a two-way telephone call to be established in a conventional manner. The line interface circuit 1 is also connected to FSK decoder 4, which extracts CLASS signalling data embedded between the ringing the signals of an incoming call. The FSK decoder 4 is connected to system bus 5, as is the telephone circuitry 3.

A display 6 permits a display of incoming name and number data, as well as numbers stored in storage device 7.

Keypad 8 enables telephone numbers to be called in a conventional manner, or alternatively speed call numbers to be entered and stored in database 7.

The speedcall numbers are assigned to individual speedcall buttons 9.

The system operates under control of microcomputer 10.

In normal operation, the user can enter speedcall numbers through the keypad 8, usually by prefixing the numbers with a special code to indicate that the subsequent names and numbers are for entry into the data base. This aspect of the system works in a conventional manner.

In order to make a speedcall, the user simply selects the appropriate speedcall button, depresses it, and the system takes over and automatically dials the number associated with that button in the storage device 7. The storage device 7 is desirably a non-volatile ram. Alternatively, a volatile memory can be employed provided power is maintained to the system.

In a conventional manner, the line interface circuitry takes care of the basic telephony function, including detecting the ringing voltage and converting the telephony voice signal to that required for the telephone circuitry, which may include the handset. The line interface circuit can also include the FSK decoder shown separately as block 4, although in the present embodiment it is assumed that it does not.

The FSK decoder 4 monitors an incoming ringing signal and extracts the calling party's name and telephone number, which under the control of the microcomputer 10, is displayed on display 6.

In addition, in accordance with the invention, the microcomputer 10 matches the name of the calling party with the name stored in the storage device 7, and then compares the extracted number with the stored number. If the two do not match, the system assumes that the calling party has changed his or her number, and thus updates the stored number in the storage device 7.

This operation is performed in a continual manner. Each time an incoming signal is received, the microcomputer attempts to match the name with the number stored in the storage device. In the event of a match, the stored number is updated.

To allow for the possibility that the incoming name may not appear in exactly the same format as stored in the storage device 7, the microcomputer 10 can employ fuzzy logic principles to identify a close match.

The invention has been described with the aid of a microcomputer 10. However, it will be well understood by a person skilled in the art that the invention can be implemented without the need for the microcomputer 10. In such an embodiment, the comparison described above would be implemented with hard wired logic gates.

The invention can also be applied to other technologies, such as fax machines and automatic security If it is known that the called party has a system in accordance with the invention, a person changing phone number, or fax number, can merely call the subscriber in question, and allow sufficient time for the CLASS signals to be transmitted. However, it is not necessary for the telephone or fax machine to be answered for the speedcall numbers to be updated.

It will be realized that it is not necessary for the display 6 to be present for the invention to work. The invention will work equally well in the absence of a display. It is merely necessary to extract the number and name data and compare it with the corresponding data in the storage device.

The invention has been described with reference to speedcall buttons, although of course it will work equally well with short speedcall codes. For example, the telephone set may allow the user to assign two digit codes to seven or ten digit telephone numbers.

The embodiments of the invention in which an exclusive property or privilege is claimed are defined as follows:

1. A method of controlling a local telephone station to facilitate the making of calls, comprising the steps of:

storing name and telephone number data for a plurality of subscribers in association with respective speedcall facilities at said local telephone station in a local database to permit the making of telephone calls from said local telephone station by activating the appropriate speedcall facility for a selected subscriber;

receiving an incoming call at said local telephone station from a calling party;

extracting data representing the calling party's name and telephone number from caller id data associated with the incoming call;

matching data representing the calling party's name with name data stored in said database;

comparing said extracted data representing the calling party's number with number data stored in said database and associated with the calling party's name; and changing the number data stored in said database and associated with the calling party to the extracted number data when said extracted data and said stored data do not match.

2. A method as claimed in claim 1, wherein said name and number data stored in the local database are associated with speedcall buttons.

3. A method as claimed in claim 1, wherein said name and number data stored in the local database are associated with speedcall identity codes.

4. A method as claimed in claim 1, wherein said name and number data are extracted from the data transmitted between rings of an incoming call.

5. A telephone apparatus with speedcall capability, comprising a database for storing data representing names and associated telephone numbers of subscribers in association with respective speedcall facilities to permit the making of telephone calls by activating the appropriate speedcall facility for a selected subscriber, a decoder for extracting name and number data from caller id data associated with an incoming call, matching data representing the calling party's name with name data stored in said database; means for comparing the extracted data representing the calling party's number with said stored data, and means for changing the stored number data to the extracted number data when the compared stored number data does not match the extracted number data for a particular subscriber name.

6. A telephone apparatus as claimed in claim 5, wherein said stored telephone names and numbers are associated with respective speedcall buttons on the telephone.

* * * * *